US008701008B2

(12) United States Patent (10) Patent No.: US 8,701,008 B2
Keng et al. (45) Date of Patent: Apr. 15, 2014

(54) SYSTEMS AND METHODS FOR SHARING MULTIMEDIA EDITING PROJECTS

(75) Inventors: Shih-Ling Keng, Taipei (TW); Jau-Hsiung Huang, Sindian (TW)

(73) Assignee: Cyberlink Corp., Shindian, Taipei (TW)

( * ) Notice: Subject to any disclaimer, the term of this patent is extended or adjusted under 35 U.S.C. 154(b) by 594 days.

(21) Appl. No.: 12/486,864

(22) Filed: Jun. 18, 2009

(65) Prior Publication Data

US 2010/0325547 A1 Dec. 23, 2010

(51) Int. Cl.
*G06F 3/048* (2013.01)
(52) U.S. Cl.
USPC .......................................................... 715/723
(58) Field of Classification Search
USPC .......................................................... 715/723
See application file for complete search history.

(56) References Cited

U.S. PATENT DOCUMENTS

| 7,142,225 B1 * | 11/2006 | Boler et al. ............ 345/619 |
| 2001/0049704 A1 * | 12/2001 | Hamburg et al. ............ 707/530 |
| 2002/0002562 A1 * | 1/2002 | Moran et al. ............ 707/500 |
| 2007/0179979 A1 | 8/2007 | Folgner et al. |
| 2008/0013916 A1 * | 1/2008 | Sharpe et al. ............ 386/52 |
| 2010/0070643 A1 * | 3/2010 | Puranik et al. ............ 709/231 |

FOREIGN PATENT DOCUMENTS

| WO | WO 2008/033840 | 3/2008 |
| WO | WO 2008/101038 | 8/2008 |

OTHER PUBLICATIONS

JPEG 2000 at http://www.jpeg.org/public/fcd15444-2.pdf.*

* cited by examiner

*Primary Examiner* — Weilun Lo
*Assistant Examiner* — Peiyong Weng
(74) *Attorney, Agent, or Firm* — McClure, Qualey & Rodack, LLP

(57) ABSTRACT

The sharing of video editing techniques is performed by receiving a project description file, thumbnail graphics, and a location identifier at a first server, wherein the project description file is generated during editing of multimedia content by the user, and wherein the thumbnail graphics represent multimedia editing objects incorporated into the edited multimedia content. The edited multimedia content is retrieved from a second server based on the location identifier. The edited multimedia content is synchronized with the thumbnail graphics and multimedia editing objects specified by the project description file. The synchronized edited multimedia content, thumbnail graphics, and multimedia editing objects are displayed.

33 Claims, 10 Drawing Sheets

SYSTEMS AND METHODS FOR SHARING MULTIMEDIA EDITING PROJECTS

TECHNICAL FIELD

The present disclosure generally relates to editing multimedia content and more particularly, relates to systems and methods for sharing multimedia editing projects.

BACKGROUND

With the vast array of video editing tools available, many people can readily edit existing video and incorporate special effects to customize videos and to produce stylish graphics. These videos may later be published for others to view. In many cases, however, an individual may want a more professional look before sharing the video with friends and family. Use of professional video editing services may not be a feasible alternative in many instances due to cost. One common problem with traditional video editing solutions, however, is the degree of time and complexity involved in the overall editing process. Therefore, there exists a need for improving a user's ability to share video editing techniques with others.

SUMMARY

Briefly described, one embodiment, among others, is a method performed at a first server for sharing video editing techniques by a user. The method comprises receiving a project description file, wherein the project description file is generated during editing of multimedia content by the user, and the project description file contains information relating to the edited multimedia content. The method further comprises receiving a location identifier specifying a location of the edited multimedia content, retrieving the edited multimedia content from a second server using the location identifier, providing a user interface comprising a timeline, and displaying multimedia editing objects specified by the project description file along the timeline. While rendering the edited multimedia content received from the second server on the user interface, the rendering of the edited multimedia content is synchronized with the multimedia editing objects according to timing data specified in the project description file with respect to the timeline.

Another embodiment is a system for sharing multimedia editing techniques. The system comprises a first server and a project sharing application executable in the first server that responds to requests for reviewing edited multimedia content. For such embodiments, the project sharing application comprises a user interface configured to receive the edited multimedia content from a second server and an object collecting module configured to receive a project description file associated with timing data of the edited multimedia content and determine arrangement of multimedia editing objects specified in the project description file. The project sharing application further comprises a playback module configured to playback the edited multimedia content from the second server while the multimedia editing objects specified in the project description file are synchronized according to the timing data.

Another embodiment is a method for sharing multimedia content editing techniques by a user. The method comprises receiving a project description file, thumbnail graphics, and a location identifier at a first server, wherein the project description file is generated during editing of multimedia content by the user, and wherein the thumbnail graphics represent multimedia editing objects incorporated into the edited multimedia content. The method further comprises retrieving the edited multimedia content from a second server based on the location identifier. The method also comprises synchronizing the edited multimedia content with the thumbnail graphics and multimedia editing objects specified by the project description file and displaying the synchronized edited multimedia content, thumbnail graphics, and multimedia editing objects.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
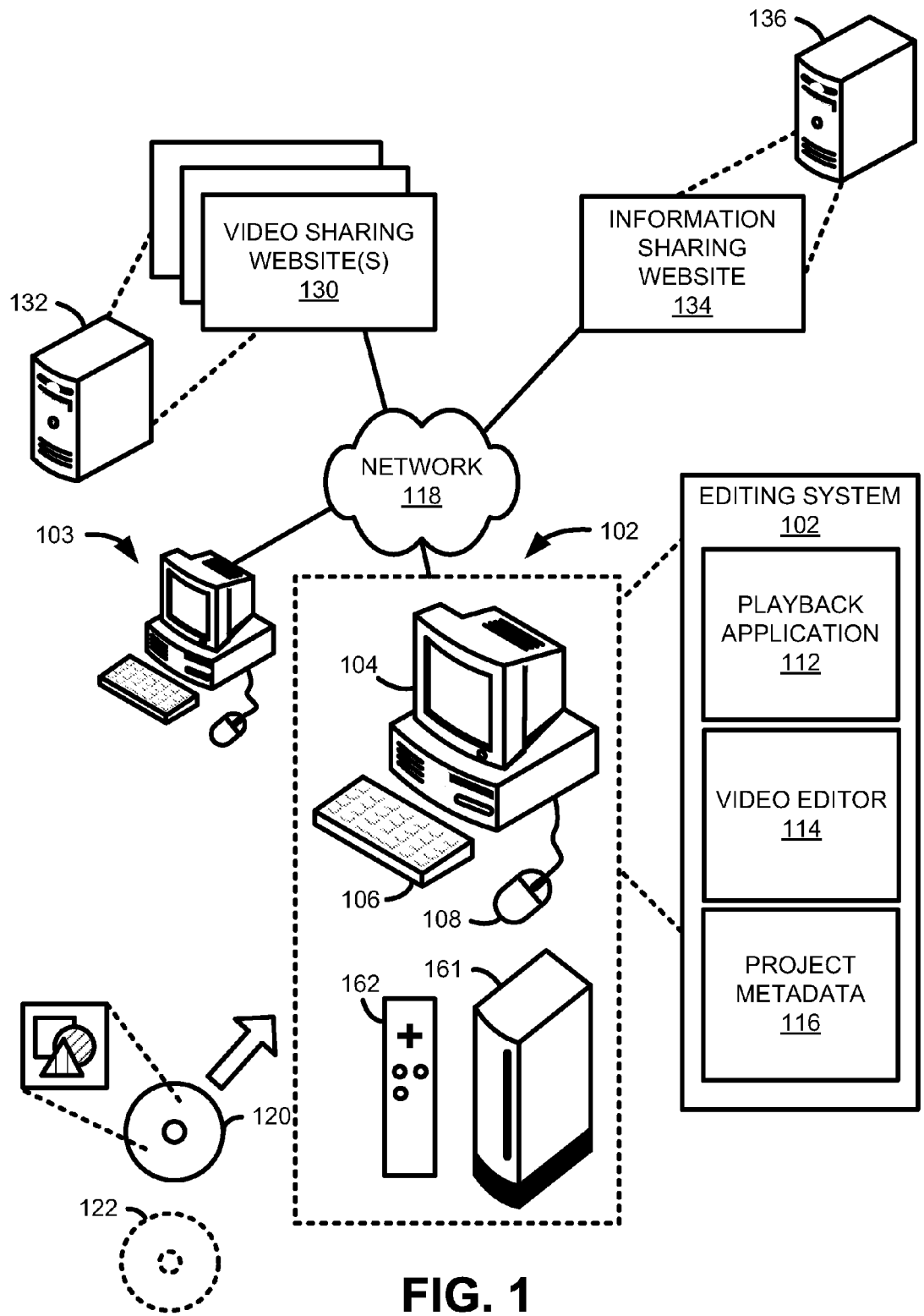
FIG. 1 depicts a top-level diagram of a system for sharing multimedia editing techniques.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

One perceived shortcoming with traditional multimedia editing solutions is the degree of time and complexity involved in the overall editing process. Various embodiments are thus described where a user uploads a multimedia editing project in order to allow other users to view and track the editing process of multimedia content. In this regard, the embodiments described provide users with a means for sharing creative ideas in editing multimedia content so that those with more extensive experience in editing multimedia content have a forum for sharing their techniques with others. In the following discussion, a description of the various components of a networked environment is described, followed by a discussion of the operation of these components. It should be understood that, as used herein, "video" or "multimedia content" may include, but is not limited to, video data, audio data, text, still images, or combinations of such content.

Reference is made to FIG. 1, which depicts a top-level diagram of a system for sharing multimedia editing techniques. For some embodiments, a system for sharing multimedia editing techniques may be incorporated in an editing system 102 such as, for example, a desktop computer, a computer workstation, or a laptop. The editing system 102 may include a display 104 and input devices such as a keyboard 106 and a mouse 108. In other embodiments, the editing system 102 may comprise a video gaming console 161, which includes a video game controller 162. For such embodiments, the video gaming console 161 may be connected to a television (not shown) or other display. Generally, the editing system 102 may comprise a playback application 112 such as CyberLink's PowerDirector®. The playback application 112 is generally embodied on a computer readable medium and executable by a processor that allows a user to view a movie title, input special effects, and upload a video editing project. The editing system 102 may further comprise project metadata 116, which is created and collected in a project description file, for example, during the video editing process using a video editor 114.

The project metadata 116 may be used to specify certain attributes of a video and may be utilized in a wide variety of ways. As non-limiting examples, metadata might contain miscellaneous information about a given video such as the chapter list, content rating (e.g., General (G), Parental Guidance (PG), PG-13, Restricted (R)), performers (actors, actresses, musicians, etc.), and a brief synopsis of the movie. Other non-limiting examples include information relating to the multimedia editing objects such as special effects, audio, and subtitles incorporated into video clips. Such information may comprise, for example, timing data of each of the special effects, audio, and subtitles and the category of special effect. By way of illustration, the metadata might specify that a customized subtitle is shown at start time 00:00:31 and disappears at an end time 00:00:41 in a particular video. As another illustration, the metadata might specify that a picture-in-picture (PiP) object such as a star object is shown in the video at a start time 00:00:45 and disappears at an end time 00:00:55. With exemplary embodiments described, project metadata 116 may be generated during the video editing process and associated with a video editing project. Note that the video editing project may comprise a combination of project metadata 116 and existing metadata associated with a particular video.

The editing system 102 in FIG. 1 reads multimedia content stored in any of a variety of formats or stored on various types of storage media. As non-limiting examples, the editing system 102 may be configured to read media content encoded in such formats as Digital Video Disc (DVD), Video CD (VCD), High Definition DVD (HD-DVD), BLU-RAY Disc, and China Blue High-Definition (CBHD) stored on a storage medium 120. In some embodiments, the editing system 102 may also be configured to read multimedia content from managed copies 122 of an HD-DVD or a BLU-RAY Disc. The phrase "managed copy" refers to authorized copies of multimedia content used as a reference video for editing purposes. The above exemplary formats are merely examples, and it is intended that the various embodiments described herein cover multimedia content in general.

The editing system 102 receives the storage media 120 or managed copies 122 containing the multimedia content and plays back the multimedia for a user to view and edit. In some embodiments, the editing system 102 may be coupled to a network 118, such as the Internet. For some implementations, the networked environment depicted in FIG. 1 may be configured to incorporate cloud computing, whereby hosted services are delivered via the Internet. In accordance with some embodiments, a user uploads an edited multimedia content to one or more video sharing/content portal websites 130, such as, for example, YouTube. Such websites 130 may be hosted on a web portal server 132 and where web pages are rendered locally on the display 104 of a computer 102.

The networked environment shown in FIG. 1 further comprises a information sharing website 134, such as, for example, CyberLink's® DirectorZone or other Web 2.0 websites, where users can upload a project description file containing project metadata 116 to and share their video editing techniques with others. For some implementations, project description files may include a mapping table that specifies a particular multimedia editing object, a corresponding description, and a corresponding time tag. As such, the information sharing website 134 may serve as a forum for users to share their video editing projects. Note that for some implementations, the information sharing website and the video sharing/content portal website may be integrated into a single website. Also shown in FIG. 1 is a viewing system or client 103, which allows a second user to view edited multimedia content created on the editing system 102. The viewing system 103 may also be connected to the network 118. Through the network 118, the second user may utilize the viewing system or client 103 to view both the edited multimedia content and the project metadata including multimedia editing objects such as special effects, audio and subtitles incorporated by the first user by accessing the information sharing website 134. The edited multimedia content may comprise a combination of edited video and audio.

Figure 2:
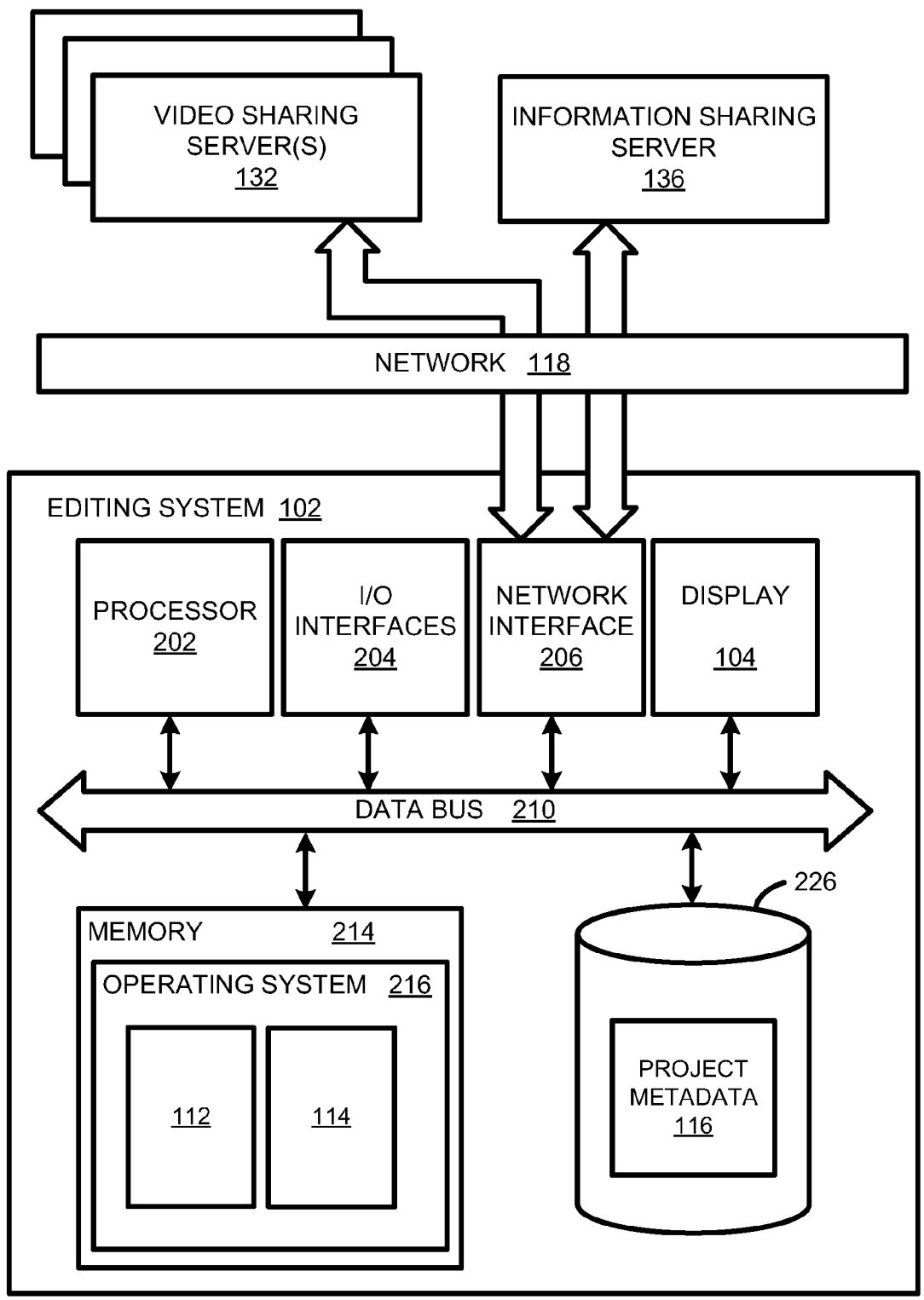
FIG. 2 illustrates an embodiment of the computing device shown in FIG. 1.

Reference is now made to FIG. 2, which illustrates an embodiment of the editing system 102 shown in FIG. 1. Generally speaking, the editing system 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. The editing system 102 may also comprise a video game console such as the popular Wii® platform by Nintendo and the Playstation 3® from Sony. Irrespective of its specific arrangement, editing system 102 can, for instance, comprise memory 214, a processing device 202, a number of input/output interfaces 204, a network interface 206, a display 208, and mass storage 226, wherein each of these devices are connected across a data bus 210.

The processing device 202 can include any custom made or commercially available processor, a central processing unit (CPU) or an auxiliary processor among several processors associated with the editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software such as the playback application 112 and video editor 114 depicted in FIG. 1. One of ordinary skill in the art will appreciate that the memory 214 can, and typically will, comprise other components which have been omitted for purposes of brevity.

Input/output interfaces 204 provide interfaces for the input and output of data. For example, where the editing system 102 comprises a personal computer, these components may interface with user input device 204, which may be a keyboard or a mouse, as shown in FIG. 1. Where the editing system 102 comprises a gaming console, the input/output interfaces 204 may communicate with a video game controller such as, for example, the wireless Wii Remote® and Wii MotionPlus® from Nintendo or the DualShock® and wand-shaped motion controller from Sony. Using such controllers, a user can incorporate multimedia editing objects into a video through a series of motions. Display 208 can comprise, for example, a computer monitor, plasma television, or a liquid crystal display (LCD).

In the context of this disclosure, a "computer-readable medium" stores the program for use by or in connection with the instruction execution system, apparatus, or device. The computer readable medium can be, for example, but not limited to, an electronic, magnetic, optical, electromagnetic, infrared, or semiconductor system, apparatus, device, or transport medium. More specific examples (a non-exhaustive list) of the computer-readable medium may include by way of example and without limitation: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

With further reference to FIG. 2, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 2, the editing system 102 may communicate with the video sharing server 132 and the information sharing server 136 via the network interface 206 over the network 118. As noted earlier, the video sharing server 132 and the information sharing server 136 may be integrated into a single server for some embodiments. The editing system 102 may further comprise mass storage 226 which stores and manages such data as the project metadata 116 associated with a video editing project.

Figure 3:
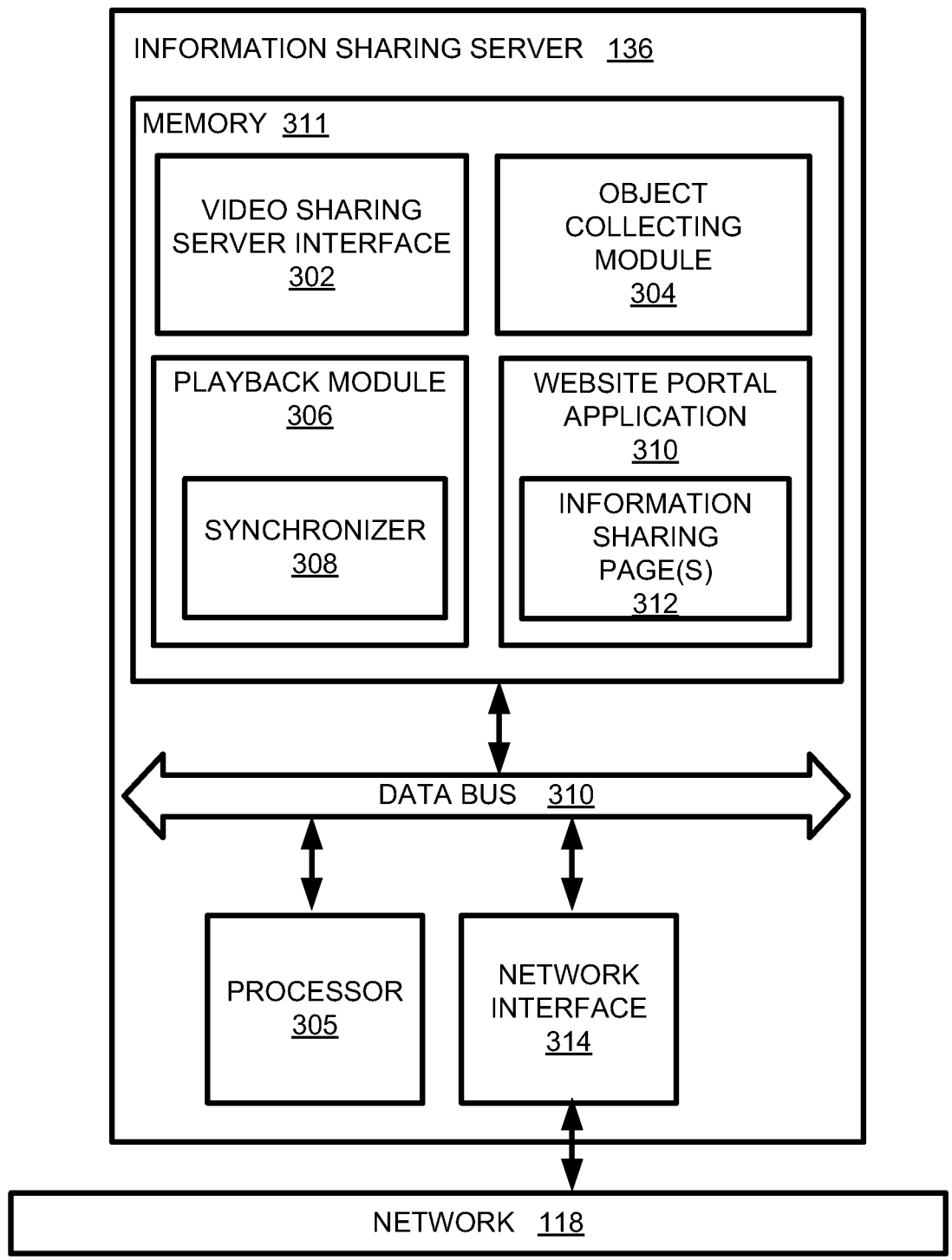
FIG. 3 illustrates an embodiment of the director forum server shown in FIG. 1.

Reference is made to FIG. 3, which illustrates an embodiment of the information sharing server 136 shown in FIG. 1. As with the editing system 102 described above for FIG. 1, the information sharing server 136 may comprise any one of a wide variety of computing devices, such as a desktop computer, portable computer, and so forth. The information sharing server 136 may be further embodied in a server-client configuration as known by one of ordinary skill in the art. The information sharing server 136 further comprises memory 311, a processing device 305, and a network interface 314, which allows the information sharing server 136 to communicate with external devices such as the editing system 102 and viewing system/client 103 in FIG. 1 via the network 118. Each of these components 311, 305, 314 may be connected across a data bus 310.

The memory 311 may comprise application specific software such as a video sharing server interface 302 that allows the information sharing server 136 to receive video and other content from the video sharing server 132 or other web portals. The memory 311 further comprises an object collecting module 304 configured to receive project metadata 116 stored in a project description file and determine which special effects, audio, and subtitles have been incorporated into a particular video. The playback module 306 receives the video from the video sharing server interface 302 and the multimedia editing objects such as special effects, audio, and subtitles from the object collecting module 304 and forwards the data to the synchronizer 308. The synchronizer 308 provides an output comprising the edited multimedia content synchronized with the multimedia editing objects such as special effects, audio, and subtitles. The information sharing server 136 further comprises a website portal application 310 stored in memory 311 which hosts and manages one or more information sharing web pages 312.

The information sharing web pages 312 are rendered on a display at the user end and provide a user such as one utilizing the viewing station/client 103 in FIG. 1 with a graphical user interface for uploading video editing project data. The website portal application 130 also receives the output generated by the synchronizer 308 and renders the output on one or more information sharing pages 312 for a user to view. As will be described later, a viewing station or client 103 receiving the output views the edited multimedia content in addition to various thumbnail graphics depicted in a timeline. The thumbnails signify the various special effects, audio, and subtitles and the associated timing that have been incorporated into the video. As described earlier, a computer-readable medium can be any medium that can contain, store, or maintain the various applications 302, 304, 306, 310, 312 described above for use by or in connection with an instruction execution system whereby a processor 305 executes the applications 302, 304, 306, 310, 312.

Figure 4A:
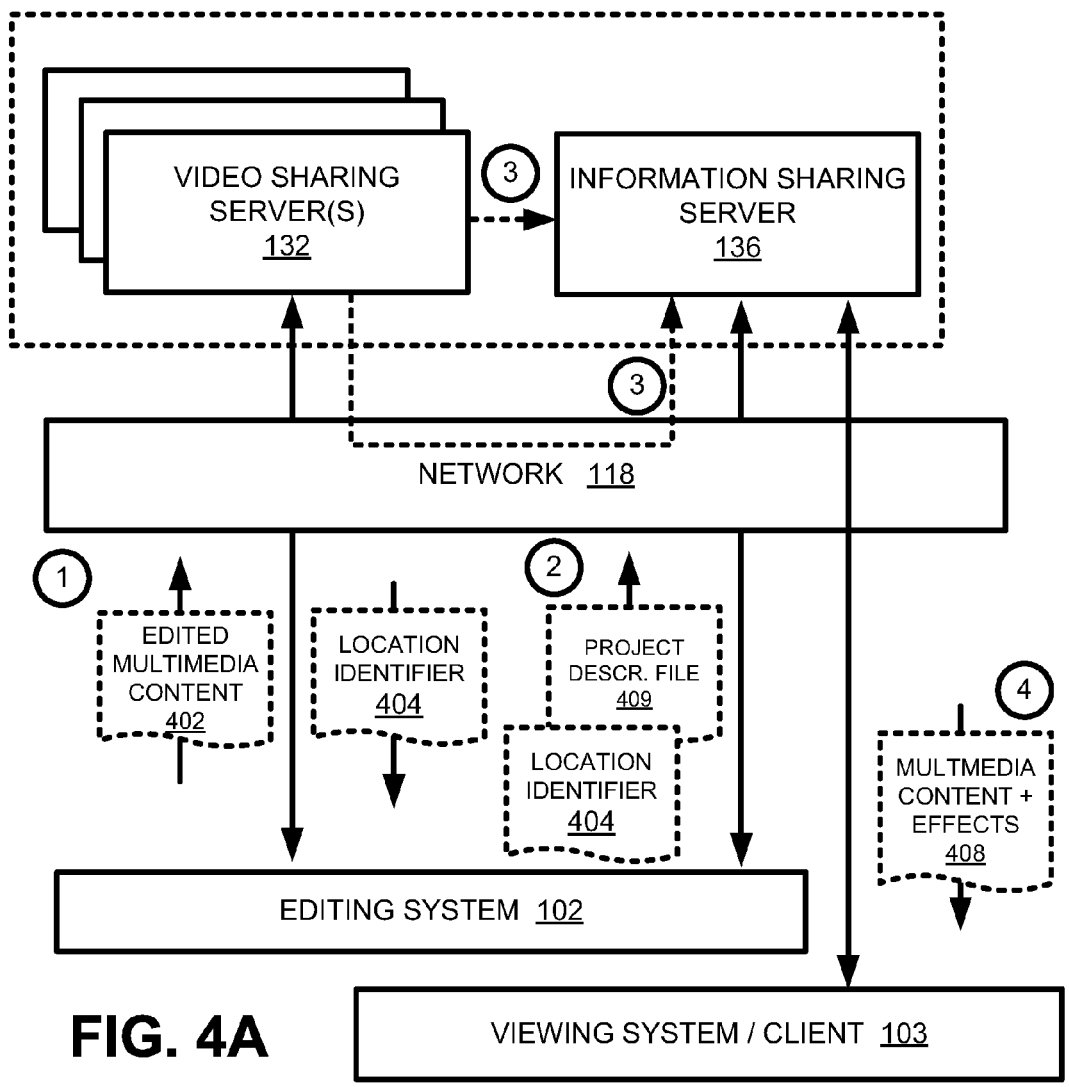
FIGS. 4A-B illustrate the general data flow between the video system, the one or more video sharing servers, and the director forum server shown in FIG. 1.

FIG. 4A illustrates the general data flow between the video system 102, the one or more video sharing servers 132, and the information sharing server 136 shown in FIG. 1. As denoted by the dashed box, the video sharing server 132 and the information sharing server 136 may be integrated into a single server for some embodiments. For embodiments where one or more video sharing servers 132 and the information sharing server 136 are embodied on separate servers, the servers 132, 136 may communicate over the network 118. Alternatively, if the servers 132, 136 are embodied on a single server, the servers 132, 136 may communicate via an internal interface.

Figure 4B:
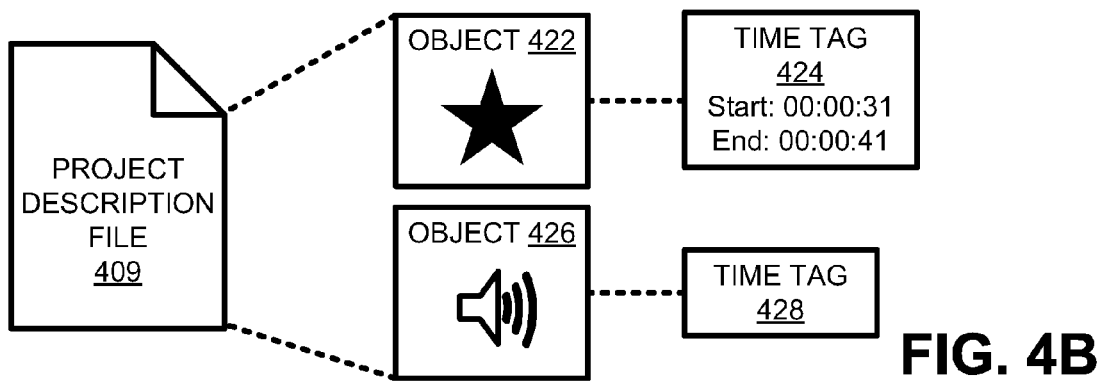

A user edits a video using a video editor 114 on the editing system 102 in FIG. 1, whereby project metadata 116 associated with the video editing process is generated, and the association of the project metadata 116 is stored in a project description file 409. The project description file 409 may be in the form of an extensible markup language (XML) file or written in other language. As shown in FIG. 4B, the project description file 409 may include a plurality of objects 422, 426, which may include, for example, thumbnails, effects, original video clips, audio, subtitle, etc. For some embodiments, the project description file 409 may thus comprise an XML file and thumbnail graphics. In other embodiments, however, the project description file 409 itself may be an XML file that describes information relating to the effects. For such embodiments, the thumbnail graphics are not included in the project description file 409. Each object 422, 426 comprises a corresponding time tag according to the edited multimedia content.

Upon editing the multimedia content, the user uploads the edited multimedia content 402 to one or more video sharing/content portal websites 130, where the edited multimedia content 402 may be stored online on the one or more video sharing servers 132. After uploading the edited multimedia content 402 and storing the edited multimedia content 402 online at the one or more video sharing servers 132, the video system 102 may receive a location identifier from the one or more video sharing servers 132, which specifies where to retrieve the stored multimedia content 402. For some embodiments, the location identifier may comprise a uniform resource locator (URL). The video system 102 then uploads the project description file 409, the thumbnail graphics, and the location identifier 404 to the information sharing server 136.

Upon playback, the edited multimedia content 402 may be streamed from the video sharing server 132 and rendered as a web page by the information sharing server 136. Specifically, the web page may be rendered on a display and viewed by the client 103. When the client 103 elects to playback the edited multimedia content 402 and view how the special effects and/or templates were incorporated into the video, the information sharing server 136 accesses the edited multimedia content 402 using the location identifier 404, and the video sharing server 132 streams the edited multimedia content 402 to the information sharing server 136. In the non-limiting example described earlier, the video sharing website may be the popular YouTube website, where many individuals access personalized video content. In implementations where the edited multimedia content 402 is stored on YouTube, the information sharing server 136 interfaces with the YouTube server(s) using a YouTube application programming interface (API), whereby video content is played back on the information sharing web page to provide seamless playback. Thus, during playback of a selected multimedia content 402, the viewing station/client 103 receives both the edited multimedia content 402 and the special effects, audio, and subtitles 408 synchronized together. This allows the user at the viewing station 103 to precisely follow the editing process and techniques utilized by the first user 102 in editing the video.

Figure 5:
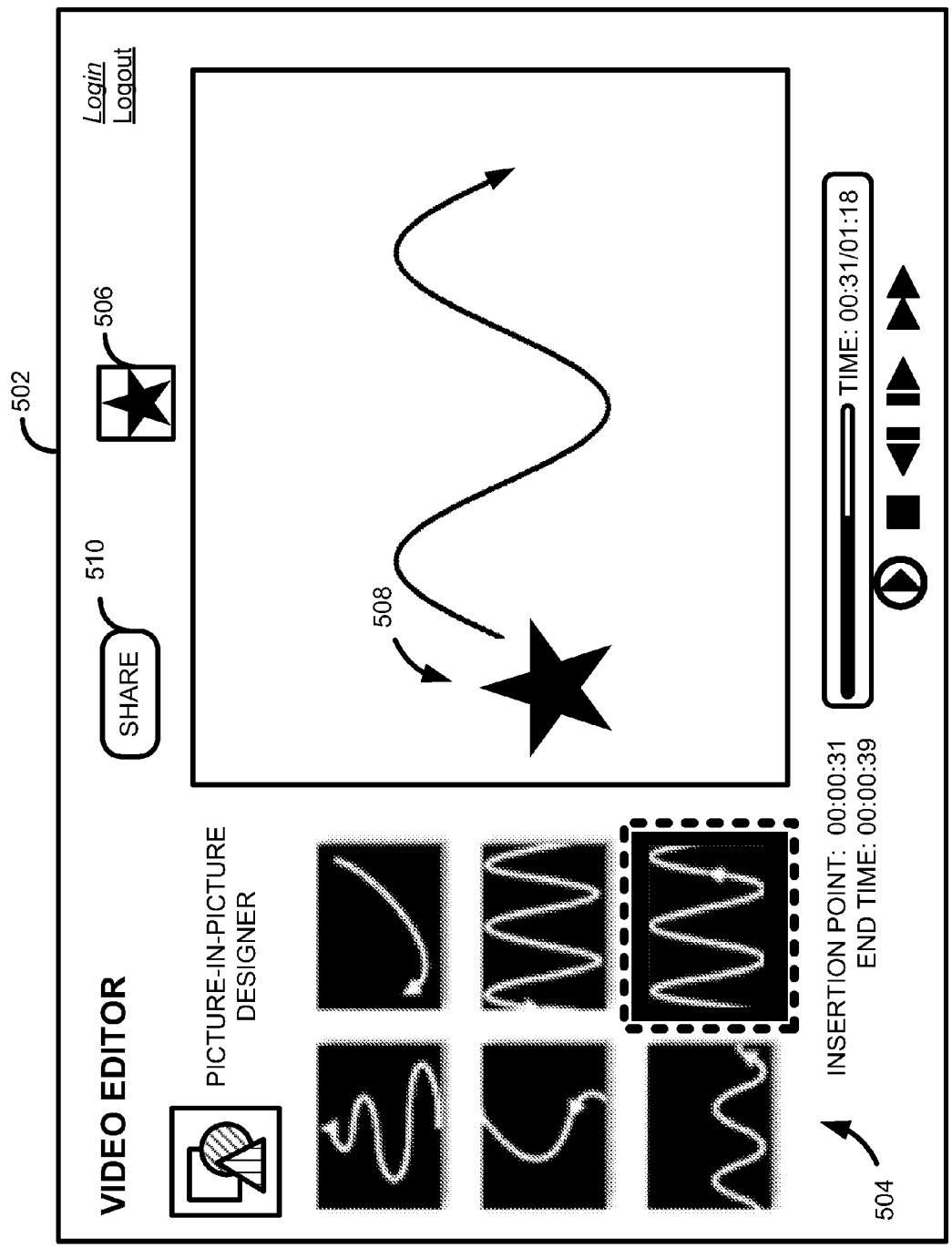
FIG. 5 is an example user interface of the video editor executed on the video system in FIG. 1.

FIG. 5 is an example user interface 502 of the video editor 114 executed on the editing system 102 in FIG. 1. In the non-limiting example shown, the user interface 502 comprises a picture-in-picture (PiP) designer whereby a user can incorporate graphics into an existing video. In the example shown, the user interface 502 allows a user to control the motion of the graphic 508 (a star in this example). The user selects one of the pre-defined templates 504, which specifies the motion of the star 508 on the display. The PiP designer is just one of various interfaces that may be used to incorporate special effects into a video. Picture-in-picture effects may comprise static objects and moving objects. Other multimedia editing objects, may include by way of example and without limitation: customized text, customized subtitles, embedded video, embedded audio, and transition effects. A user may also decide to utilize predefined templates for editing multimedia content. Such templates may comprise "title" templates and "particle" templates. Title templates generally involve the insertion of a special frame in the display, where the special frame may coincide with a particular theme (e.g., birthday theme, wedding theme). Particle templates generally comprise predefined moving objects. Such templates may include, for example, falling snow flakes, a fire effect, or smoke effect. Other special effects include rotation of objects, blurred effects, color-modification, mosaics, and so on.

As part of the editing process, the user specifies the timing of the special effect. For example, the star 508 shown in FIG. 5 may be displayed starting at time 00:00:31, at which time, the star appears and moves in the manner shown. While the video is being edited, the special effect (i.e., star PiP effect) and the associated timing (e.g., 00:00:31 to 00:00:39) is captured in project metadata 116, which is later uploaded to the information sharing website 134 to be stored on the information sharing server 136. Furthermore, thumbnail graphics such as the one 506 shown in FIG. 5 are created that represent the various special effects being incorporated into the video. In accordance with some embodiments, the thumbnails 506 may be defined by the user by specifying, for example, a bitmap file or other graphic file. Alternatively, the thumbnails 506 may comprise a snapshot of the particular frame in which the multimedia editing object is first introduced into the edited multimedia content 402. The thumbnails 506 are also captured in the project description file 116. As described earlier, for some implementations, project metadata 116 may be stored in a project description file, whereby timing data of the multimedia editing content or special effects are specified. The project description file may be in the form of an extensible markup language (XML) file, which allows a user to share information between the editing system 102 and the information sharing server 136.

The user interface 502 further comprises a "SHARE" button 510 which allows a user to upload the edited multimedia content 402 and associated project metadata 116 to the information sharing website 134 to be shared among a community of users that access the website 134. It should be noted that that the user interface 502 may further comprise different buttons to separately upload edited multimedia content and project metadata. The user interface 502 may also be used to share an individual template (i.e., special effect) to the information sharing website 134 by clicking the "SHARE" button 510 or other button.

In some embodiments, the user may login to an existing account maintained by the information sharing server 136. The information sharing server 136 provides online storage of the video editing metadata 116 captured in a project description file 409 without the need for storing the edited multimedia content itself 402, thereby saving considerable storage space. As described above, the edited multimedia content 402 is stored at the video sharing server 132. For some embodiments, however, the video sharing server 132 and the information sharing server 136 may be integrated into a single server, so that the edited multimedia content 402 is stored in the integrated server.

Figure 6:
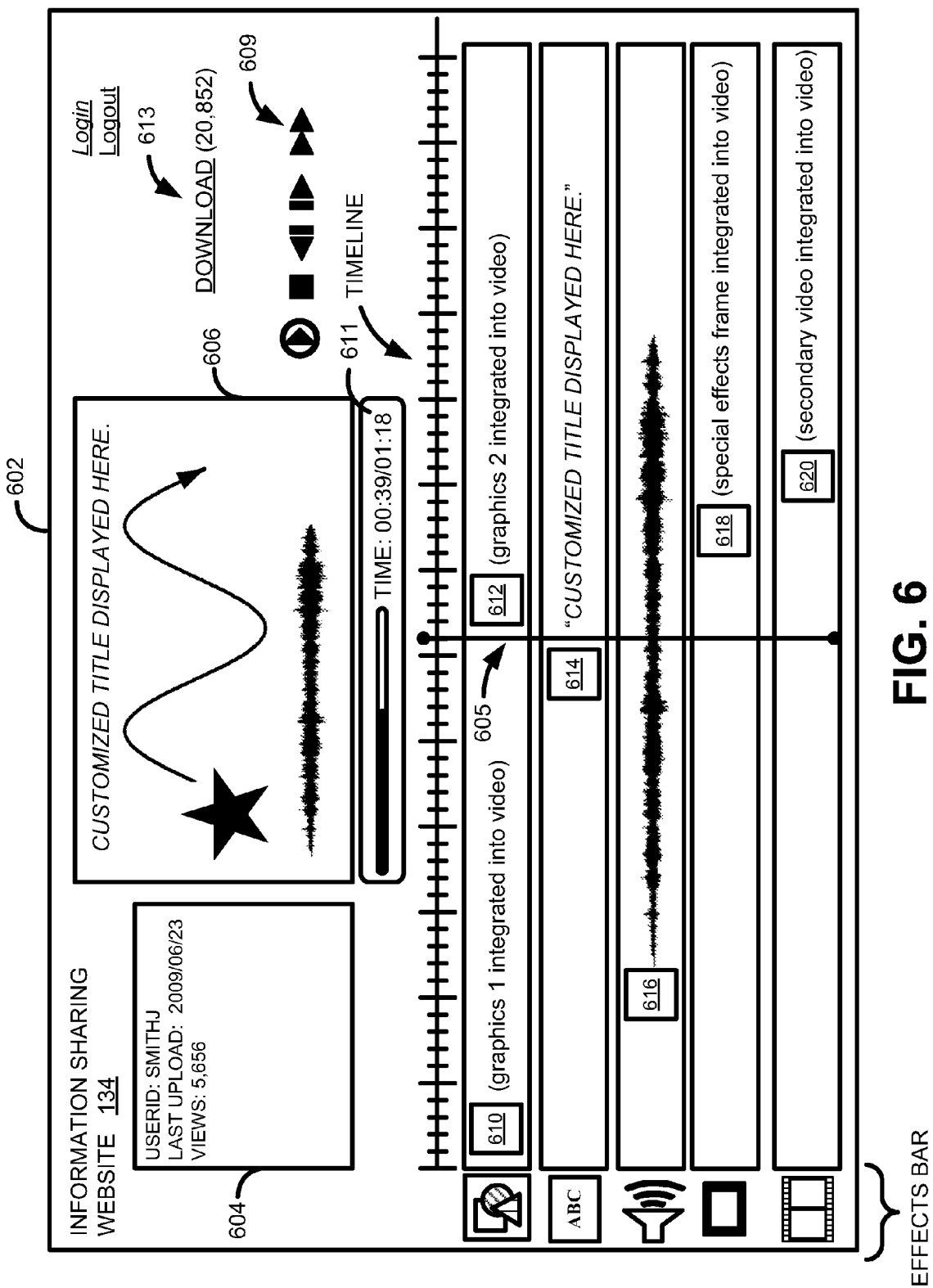
FIGS. 6-8 illustrate an example user interface executed on an information sharing server through which a user may view the edited video in addition to special effects incorporated into the video.

FIG. 6 is an example user interface 602 through which a user may view the edited multimedia content 402 in addition to multimedia editing objects or special effects incorporated into the video. As described earlier, the user may utilize the viewing system 103 in FIG. 1 to access the information sharing website 134 to select a particular author's work to view and follow the video editing techniques used or designed by the author. To facilitate this, various embodiments provide both playback of the edited multimedia content 402 in addition to illustration of the multimedia editing objects incorporated into the video. The illustration of the multimedia editing objects may involve displaying both thumbnails 610, 612, 614, 616, 618, 620 and the depiction of multimedia editing objects (e.g., added graphics, added effects, customized audio, customized subtitles, etc.). Information 604 such as user ID, description of author or content, relating to the author of the edited multimedia content 402 is shown. In addition to the user ID, the information 604 further comprises the date of the last upload and the number of views and ratings or related statistics. One should note that other features not shown may also be included. For example, the user interface 602 may include ratings and other statistics relating to the author of the edited content.

Figure 7:
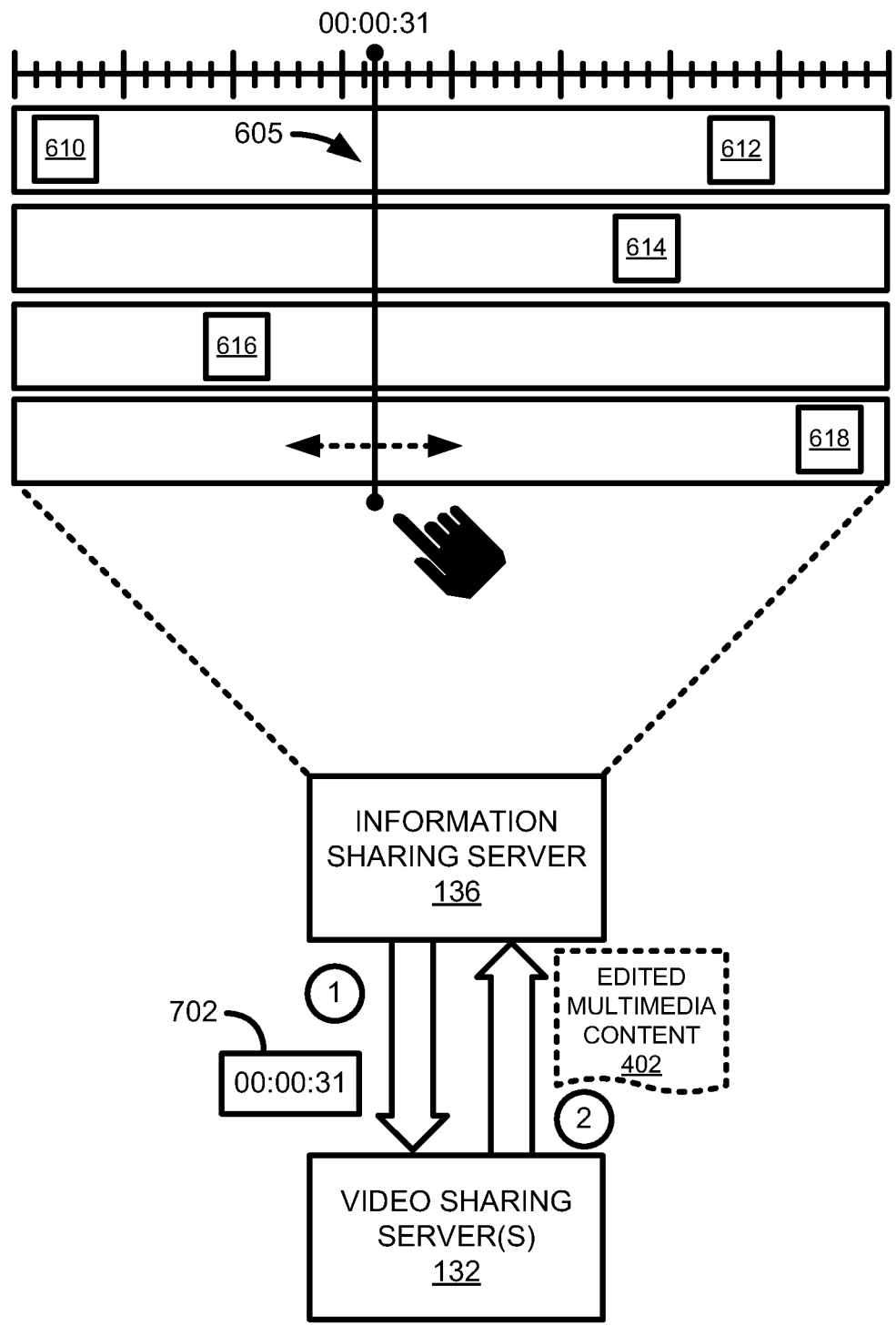
Figure 8:
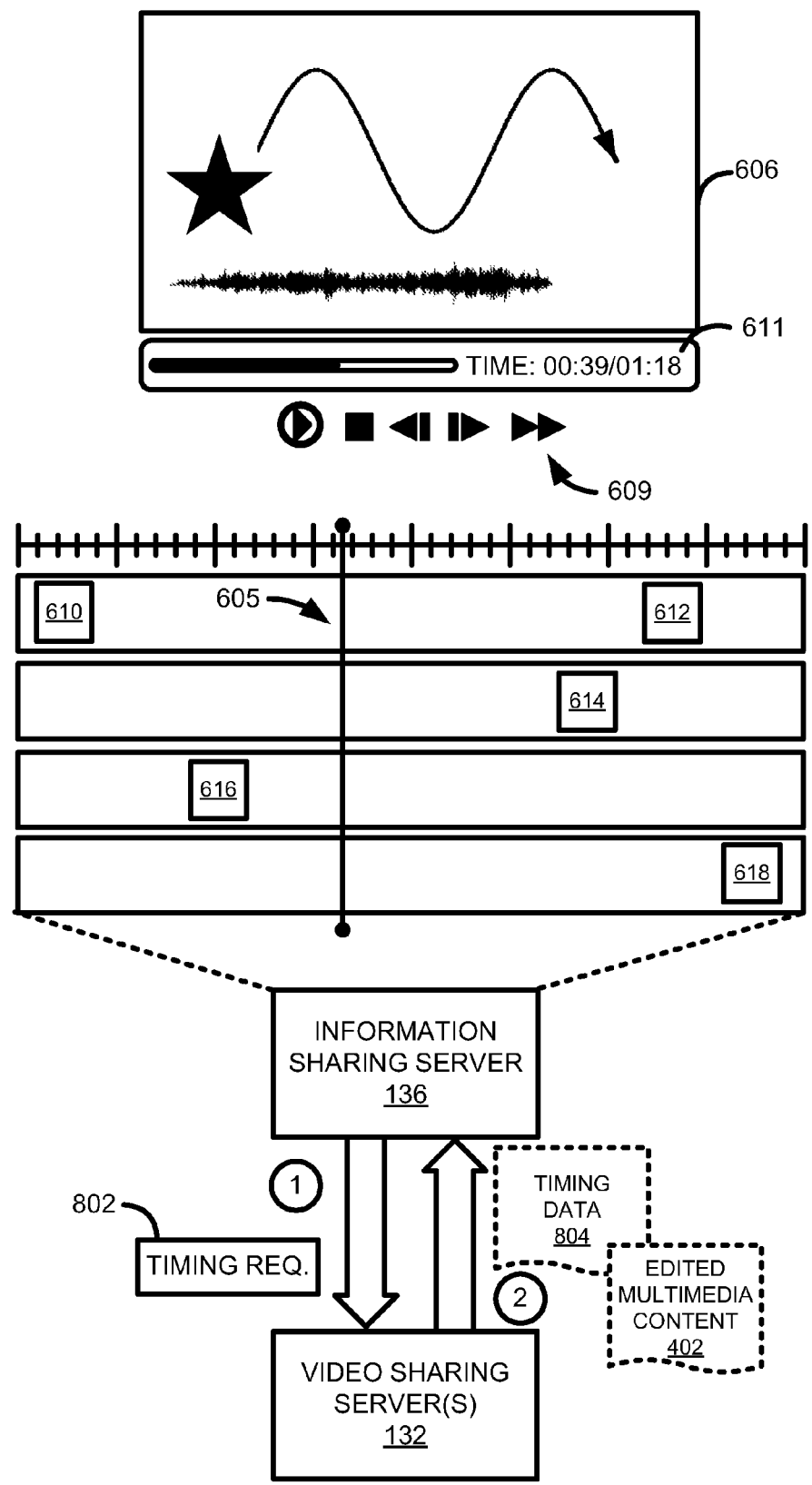

The user interface 602 further comprises a main display 606 in which the edited multimedia content 402 is played back in addition to a plurality of navigation control buttons 609 for the user to control playback, fast forward, fast backward, pause, and stop functions relating to the edited multimedia content 402. A user may click navigation control buttons 609 to view the edited multimedia content 402 or click the timing bar 611 at a particular time. A progression bar (e.g., a vertical bar) 605 on the effects bar of the user interface 602 moves according to movement of the timing bar 611 by the user and jumps to a particular time. For some implementations, a user may drag the progression bar 605 to control playback of the edited multimedia content 402, as depicted in FIG. 7. The information sharing server 136 sends timing data based on movement of the progression bar 605 to the video sharing server 132 to request streaming of the edited multimedia content 402 according to timing data 702 specified by movement of the progression bar 605. This gives the user full control in viewing the edited multimedia content 402 in conjunction with the special effects.

By way of illustration, suppose the user drags the progression bar 605 to time 00:00:31. For some embodiments, the information sharing server 136 sends this information 702 to the video sharing server 132. In response, the video sharing server 132 transmits the edited multimedia content 402, which is received at the information sharing server 136 to be displayed on the user interface hosted by the information sharing server 136. The edited multimedia content 402 is then displayed, beginning at time 00:00:31. The user interface may be rendered on the display at a client 103. For some implementations, the information sharing server 136 may receive the edited multimedia content 402 from the video sharing server 132 via streaming transmission. While the user drags the progression bar 605, the edited multimedia content 402 and the special effects are synchronized according to the associated timing specified in the project description file. As described earlier, the information sharing server 136 and the video sharing server 132 may be integrated into a single server for some implementations. For such implementations, communication between the two server modules 132, 136 may be performed via an internal interface. In this regard, displaying the time of the edited multimedia content 402 is synchronized with the location of the progression bar 605.

In an alternative embodiment, a user may control playback of the edited multimedia content 402 via navigation controls comprising the timing bar (i.e., seek bar) 611 and/or control buttons 609. For some embodiments, the navigation controls may be similar to those normally displayed by the video sharing server 132 when users wish to view multimedia content. The information sharing server 136 generates a user interface that embeds a user interface similar to one normally provided by the video sharing server 132 in order to provide seamless playback. As an illustration, the navigation controls displayed when users access the YouTube website may be embedded into the user interface hosted by the information sharing server 136. The embedded user interface includes the navigation controls 609, 611. Thus, when a user utilizes the navigation controls 609, 611 to control playback, playback instructions are executed by the video sharing server 132 rather than by the information sharing server 136. For such embodiments, the marker/progression bar 605 is synchronized with the seek bar 611 in order to show which special effect or video editing object is applied to the edited multimedia content at a particular point in time.

During playback of the edited video received from the video sharing server 132, the information sharing server 136 sends a timing request 802 to the video sharing server 132 to determine the current playback time. Based on timing data 804 received from the video sharing server 132, the information sharing server 136 updates the progression bar 605 in the user interface 602 according to the received timing data from the video sharing server 132. As one of ordinary skill will appreciate, there are different means for controlling playback of the edited multimedia content 402.

The effects bar shown in the user interface 602 comprises the various multimedia editing objects. The effects bar provides an index of the special effects, audio, subtitles, etc. used by the creator of the video. Shown also are various thumbnails 610, 612, 614, 616, 618, 620 that represent the various multimedia editing objects which are used by the author to create the edited multimedia content 402. As described earlier, the thumbnails 610, 612, 614, 616, 618, 620 may comprise customized graphics selected by the user during editing of multimedia content by using a video editor. In some embodiments, the thumbnails 610, 612, 614, 616, 618, 620 may also be automatically generated whereby a snapshot of the frame within the video 402 is stored as the thumbnail 610, 612, 614, 616, 618, 620. The user interface 602 contained in the information sharing website 134 also comprises a timeline and a marker or a progression bar 605 which shows the progression of the edited multimedia content 402 during playback. The placement of each of the thumbnails 610, 612, 614, 616, 618, 620 corresponds with the associated timing data specified in the project description file 409. The timing data or time tags 424, 428 stored in the project description file 409 specify the start time and end time of each of the multimedia editing objects.

For some implementations, the thumbnails 610, 612, 614, 616, 618, 620 appear only as the progression bar 605 passes. In other implementations, the thumbnails 610, 612, 614, 616, 618, 620 are highlighted as the progression bar 605 passes. The user may also select one of the thumbnails 610, 612, 614, 616, 618, 620 to highlight a multimedia editing object which the user is interested in. When the user clicks on the thumbnail 610, 612, 614, 616, 618, 620, the edited multimedia content is synchronized on the main display to a point in time corresponding to the timing data of the selected thumbnail 610, 612, 614, 616, 618, 620. The user viewing the editing process may further control playback of the edited multimedia content by controlling the progression bar 605 or by using the navigation controls 609 shown.

The timing data of the one or more multimedia editing objects may be monitored by viewing or controlling the timing bar 611 shown. One should note that the timing bar 611 associated with video playback is synchronized with the display or highlighting of thumbnails 610, 612, 614, 616, 618, 620 as the corresponding special effect (e.g., customized text) is incorporated into the video. As described earlier, the user may drag the progression bar 605 to jump to another point in time along the timeline. While the user is dragging the progression bar 605, the edited multimedia content 402 is synchronized and displayed on the main display 602 according to location of the progression bar 605. In this regard, the viewer can fully appreciate the timing and editing techniques used by the creator (e.g., "SmithJ") without the need for first investing in video editor software. For some embodiments, the user can also download the special effects by clicking a link 613. For other embodiments, the user can download the special effects by clicking the thumbnails 610, 612, 614, 616, 618, 620. The user will then be directed to another website to download the desired special effects. Depending on the implementation, this may involve the user downloading the previously uploaded project metadata 116. Upon downloading the project metadata 116, the user may utilize a video editor 114 compatible with the project metadata 116 and utilize the project metadata 116 as a template. To help a user navigate through the one or more information sharing websites 134 hosted on the information sharing server 136, the information sharing websites 134 may provide another user interface (not shown) whereby a user can choose to view edited multimedia content 402 that are categorized according to the special effects (e.g., static objects, motion objects, frames) contained in the edited multimedia content 402. If a user clicks on the "Motion Objects" tab, for instance, a list of edited multimedia content 402 containing moving graphics will be displayed. The user can then select specific multimedia content 402 to view.

Figure 9:
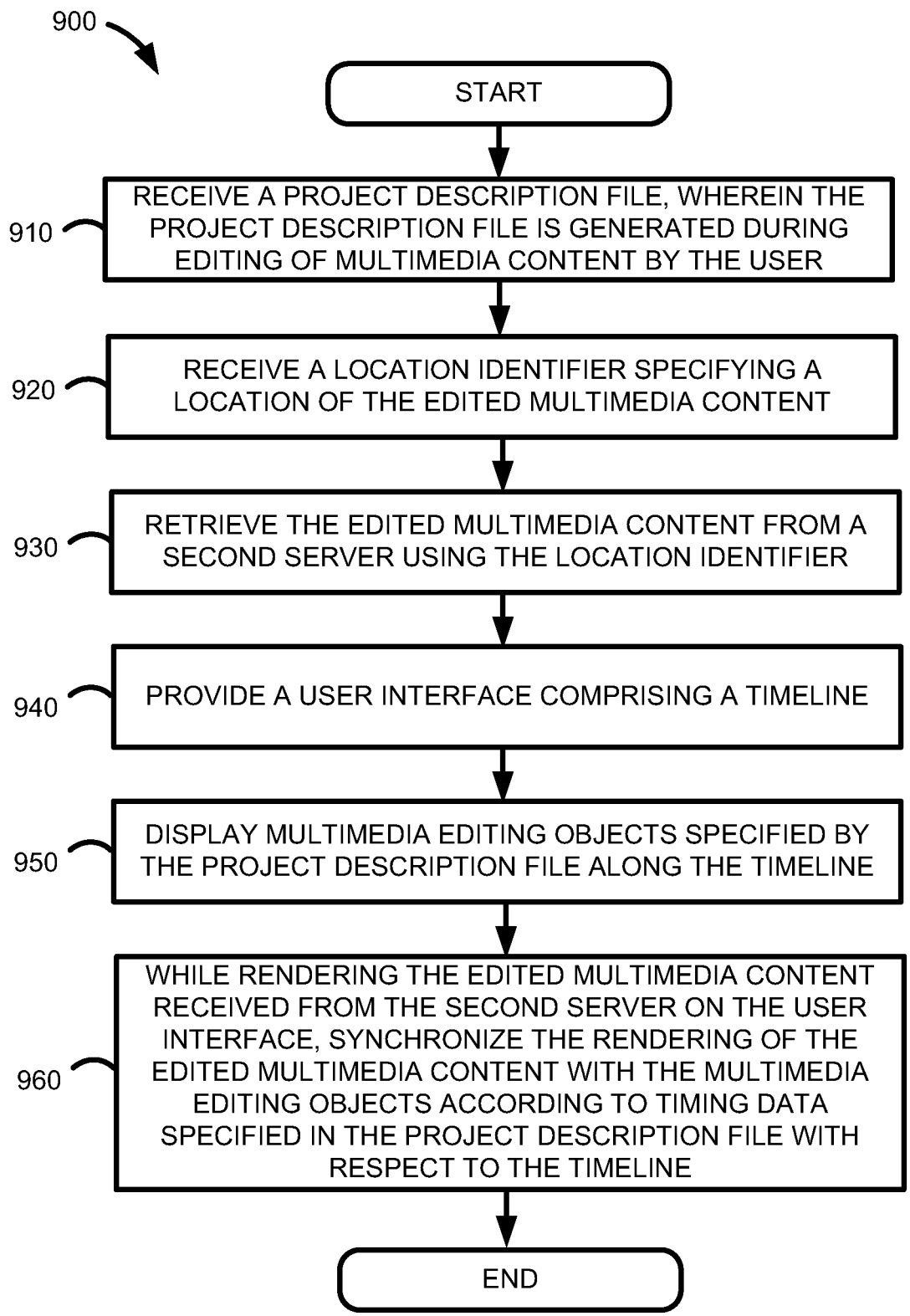
FIG. 9 is a flowchart of an embodiment for sharing multimedia editing techniques implemented in the system of FIG. 1.

FIG. 9 is a flowchart of an embodiment for sharing multimedia editing techniques implemented in the system of FIG. 1. It should be noted that if embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system such as the ones shown in FIG. 1. The machine code may be converted from the source code, etc. If embodied in hardware, each block may represent a circuit or a number of interconnected circuits to implement the specified logical function(s).

In the embodiment described below, a method is performed at a first server for sharing video editing techniques by a user. In block 910, a project description file is received. The project description file is generated during editing of multimedia content by the user and contains information relating to the edited multimedia content. In block 920, a location identifier specifying a location of the edited multimedia content is received. For some embodiments, the location identifier may comprise a uniform resource locator (URL). In block 930, the edited multimedia content is received from a second server using the location identifier. A user interface comprising a timeline is provided in block 940. In block 950, multimedia editing objects specified by the project description file are display along the timeline. While rendering the edited multimedia content received from the second server on the user interface, the rendering of the edited multimedia content is synchronized with the multimedia editing objects according to timing data specified in the project description file with respect to the timeline (block 960). Note that for some embodiments, the steps described above may be performed in real time where individuals are able to view video editing objects being incorporated into a multimedia file in real-time or near real-time. For such embodiments, the real time editing may be performed by incorporating Internet based interactive functionality into the editing system 102 of FIG. 1. For other embodiments, such real time editing may be incorporated into the Blu-ray (BD) Live platform. Using the real-time feature, users may take part in peer-to-peer interactions.

Figure 10:
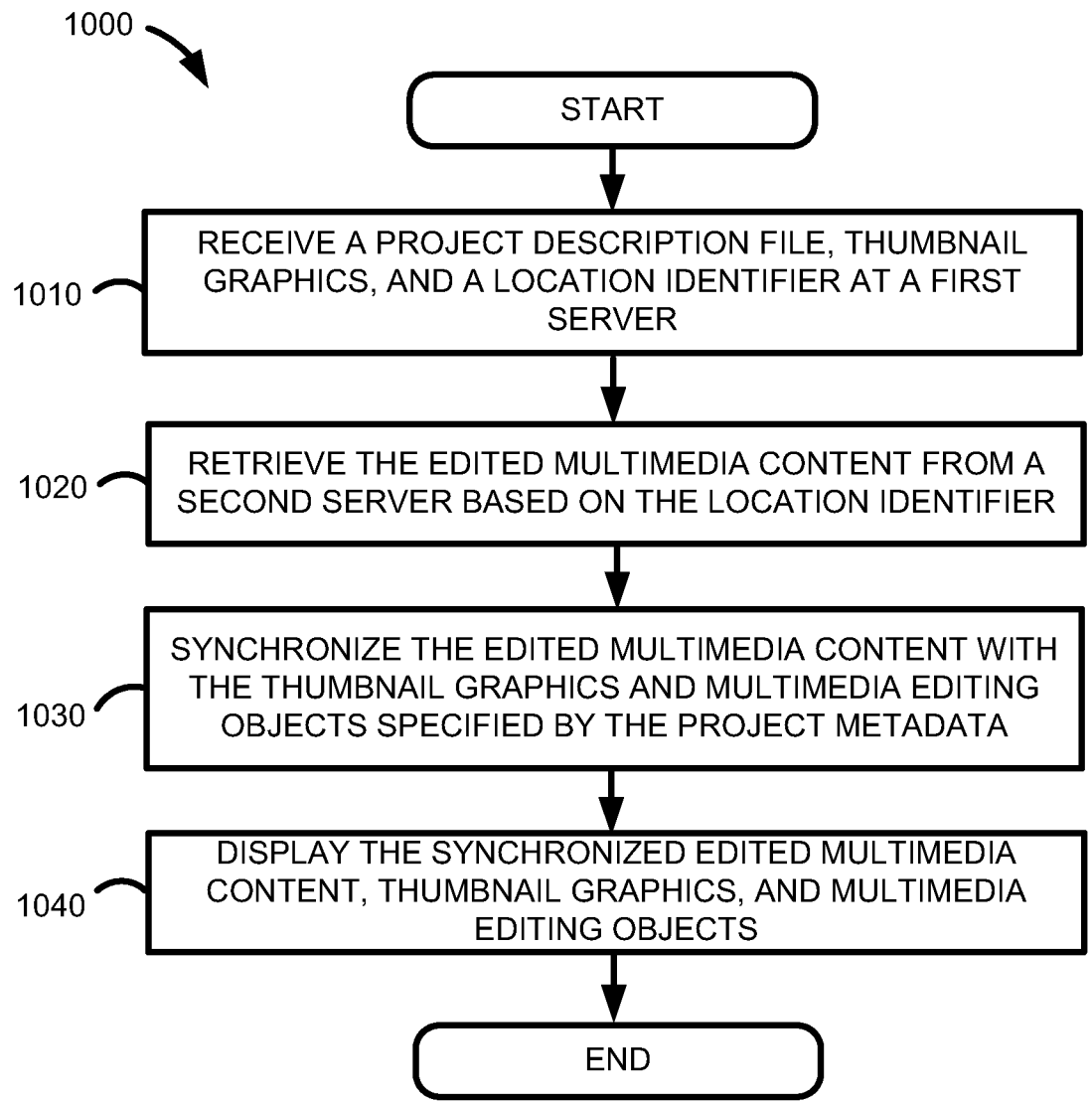
FIG. 10 is a flowchart of an alternative embodiment for sharing multimedia editing techniques implemented in the system of FIG. 1.

FIG. 10 is a flowchart of an alternative embodiment for sharing multimedia editing techniques implemented in the system of FIG. 1. Again, it should be emphasized that if embodied in software, each block described below may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system such as the ones shown in FIG. 1.

Beginning with block 1010, the method comprises receiving a project description file, thumbnail graphics, and a location identifier at a first server. Again, for some embodiments, the location identifier may comprise a URL. The project description file is generated during editing of multimedia content by the user. Furthermore, the thumbnail graphics represent multimedia editing objects incorporated into the edited multimedia content. In block 1020, the edited multimedia content is retrieved from a second server based on the location identifier. In block 1030, the edited multimedia content is synchronized with the thumbnail graphics and multimedia editing objects specified by the project metadata. In block 1040, the synchronized edited multimedia content, thumbnail graphics, and multimedia editing objects are displayed.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method performed at a first server comprising a computing device for sharing video editing techniques by a user, comprising:

receiving, at the first server, a project description file, wherein the project description file is generated during editing of multimedia content by the user, the project description file containing information relating to the edited multimedia content;

receiving, at the first server, a location identifier specifying a location of the edited multimedia content;

retrieving the edited multimedia content from a second server to the first server using the location identifier;

providing, by the first server, a user interface comprising a timeline;

displaying, by the first server, multimedia editing objects specified by the project description file along the timeline; and while displaying the edited multimedia content received from the second server on the user interface of the first server, synchronizing the displaying of the edited multimedia content with the multimedia editing objects according to timing data specifying a duration of each of the multimedia editing objects, the timing data being specified in the project description file with respect to the timeline, wherein synchronizing by the first server the displaying of the edited multimedia content received from the second server with the multimedia editing objects at the first server is performed by receiving, at the first server, a specified location of a progression bar on the timeline, wherein the multimedia editing objects comprise video editing effects previously applied to the multimedia content to generate the edited multimedia content.

2. The method of claim 1, wherein displaying multimedia editing objects specified by the project description file with respect to the timeline comprises:

extracting timing data for each of the multimedia editing objects from the project description file; and arranging the multimedia editing objects according to the timing data along the timeline.

3. The method of claim 1, wherein the timing data corresponds to application of the multimedia editing objects to the edited multimedia content.

4. The method of claim 2, wherein the timing data comprises a start time and an end time of each multimedia editing object.

5. The method of claim 1, further comprising receiving playback instructions of the edited multimedia content from a user based on selecting thumbnail graphics associated with the multimedia editing objects.

6. The method of claim 1, wherein the project description file comprises an extensible markup language (XML) file.

7. The method of claim 1, wherein receiving a location identifier comprises receiving a uniform resource locator (URL) from a video sharing server storing the edited multimedia content.

8. The method of claim 1, wherein the project description file specifies a relationship between the multimedia editing objects and timing data of each of the multimedia editing objects.

9. The method of claim 1, wherein the multimedia editing objects comprise at least one of special effects, templates, customized audio, and customized subtitles.

10. The method of claim 1, wherein the project description file further comprises one or more thumbnails, wherein each thumbnail represents at least one of: a particular video clip and a multimedia editing object.

11. The method of claim 1, wherein the project description file and edited multimedia content are generated using a video editor.

12. The method of claim 11, further comprising receiving the edited multimedia content from the second server.

13. The method of claim 1, wherein providing a user interface comprising a timeline further comprises generating the timeline on a web page.

14. The method of claim 13, further comprising displaying contents of the project description file on a web page hosted by the first server according to timing data specified in the project description file, wherein the contents of the project description file are displayed along the timeline of the web page.

15. The method of claim 1, wherein providing a user interface comprising a timeline further comprises providing navigation controls for controlling playback of the edited multimedia content on a web page hosted by the first server.

16. The method of claim 15, further comprising providing a progression bar associated with playback of the edited multimedia content, wherein the progression bar is synchronized with the navigation controls.

17. The method of claim 1, wherein retrieving the edited multimedia content from a second server using the location identifier comprises receiving the edited multimedia content through streaming transmission by the second server.

18. A system for sharing multimedia editing techniques, comprising:

a first server having a computer processor device; and a project sharing application executable in the first server that responds to requests for reviewing edited multimedia content, the project sharing application comprising:

a user interface configured to receive the edited multimedia content from a second server;

an object collecting module configured to receive a project description file associated with timing data of the edited multimedia content and determine arrangement of multimedia editing objects specified in the project description file, the timing data specifying a duration of each of the multimedia editing objects; and a playback module configured to playback the edited multimedia content from the second server while the multimedia editing objects specified in the project description file are synchronized according to the timing data, wherein the edited multimedia content received from the second server is synchronized with the multimedia editing objects at the first server according to a specified location of a progression bar on a timeline received by the first server, wherein the multimedia editing objects comprise video editing effects previously applied to the multimedia content to generate the edited multimedia content.

19. The system of claim 18, wherein the playback module further comprises a synchronizer configured to synchronize timing corresponding to playback of the edited multimedia content and the displayed multimedia editing objects.

20. The system of claim 18, wherein the playback module is further configured to perform playback based on playback instructions.

21. The system of claim 18, wherein the project sharing application further comprises a website portal application for providing one or more information sharing pages, wherein the edited multimedia content and the multimedia editing objects are displayed on the one or more information sharing pages.

22. The system of claim 18, wherein the project description file comprises an extensible markup language (XML) file.

23. The system of claim 18, wherein the user interface is further configured to communicate a uniform resource locator (URL) to the second server to retrieve the edited multimedia content.

24. The system of claim 18, wherein the object collecting module is configured to receive the project description file with one or more thumbnail graphics, wherein the thumbnail graphics represent the multimedia editing objects specified in the project description file.

25. A method performed at a first server comprising a computing device for sharing multimedia content editing techniques by a user, comprising:

receiving a project description file, thumbnail graphics, and a location identifier at the first server, wherein the project description file is generated during editing of multimedia content by the user, and wherein the thumbnail graphics represent multimedia editing objects incorporated into the edited multimedia content;

retrieving the edited multimedia content from a second server at the first server based on the location identifier;

synchronizing, by the first server, the edited multimedia content received from the second server with the thumbnail graphics and multimedia editing objects at the first server according to timing data specifying a duration of each of the multimedia editing objects, the timing data being specified by the project description file, wherein synchronizing the edited multimedia content, thumbnail graphics, and multimedia editing objects is performed by receiving, at the first server, a specified location of a progression bar with respect to a timeline; and displaying, at the first server, the synchronized edited multimedia content, thumbnail graphics, and multimedia editing objects on the timeline, wherein the multimedia editing objects comprise video editing effects previously applied to the multimedia content to generate the edited multimedia content.

26. The method of claim 25, further comprising:
  receiving playback instructions; and
  based on the playback instructions, displaying the synchronized edited multimedia content and multimedia editing objects.

27. The method of claim 26, wherein receiving playback instructions comprises receiving a thumbnail graphic selection.

28. The method of claim 25, further comprising storing the project description file, thumbnail graphics, and the location identifier in a storage device of the first server and associating the project description file, thumbnail graphics, and the location identifier with a user account.

29. The method of claim 25, wherein the step of displaying comprises rendering the synchronized edited multimedia content, thumbnail graphics, and the multimedia editing contents as a web page on a client display.

30. The method of claim 25, wherein the location identifier is a uniform resource locator (URL) generated by the second server storing the edited multimedia content.

31. The method of claim 25, wherein the first server and the second server are integrated into one server.

32. The method of claim 1, wherein the multimedia editing objects are operative to be incorporated into the synchronized edited multimedia content.

33. The method of claim 32, wherein the multimedia editing objects include at least one of graphics, special effects, audio or subtitles.

\* \* \* \* \*